Feb. 22, 1949. G. E. PULLIAM 2,462,549
SHAFT COUPLING
Filed July 18, 1944
Fig. 1.
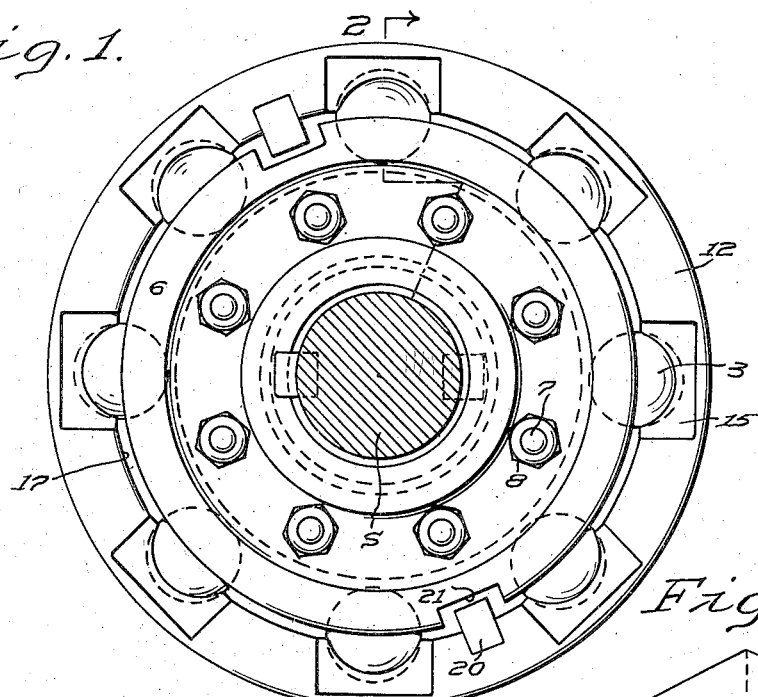
Fig. 2.
Fig. 3.
Fig. 4.
Fig. 5.
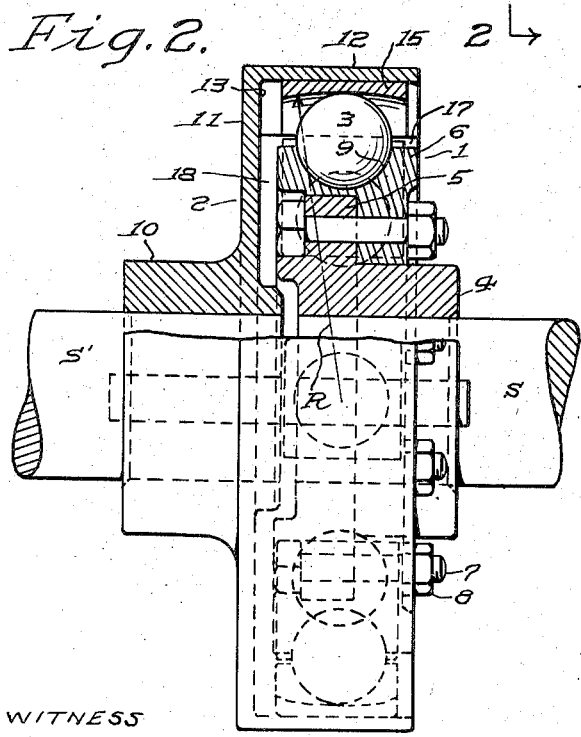
WITNESS
F. J. Hartman
INVENTOR
George E. Pulliam
BY George K. Hilbert
ATTORNEY Patented Feb. 22, 1949

2,462,549

UNITED STATES PATENT OFFICE 2,462,549

SHAFT COUPLING

George E. Pulliam, Youngstown, Ohio

Application July 18, 1944, Serial No. 545,421

6 Claims. (Cl. 64—8)

Shaft couplings essentially comprising two juxtaposed members respectively adapted for attachment to the shafts to be coupled and operatively connected by spherical elements have long been known but have been open to various objections, among which may be mentioned unequal distribution of load on the elements in case of axial disalignment of the shafts, necessity for lubrication, difficulty of inspecting and renewing the elements and low operating efficiency, some of said objections being inherent in one type and some in another but none, so far as I am aware, being free from all of them.

It is therefore a principal object of my invention to provide a shaft coupling of the general type to which reference has been made but which is effective to distribute the load equally on all the spherical elements and thus prevent the overloading of some of them if the shafts which the coupling connects are not in perfect axial alignment.

A further object is the provision of a coupling so constructed that the spherical elements may be readily inspected and conveniently replaced in case of necessity; which is noiseless in operation; requires no lubrication; is easily installed; comprises but a relatively small number of parts of a character not liable to get out of order or become damaged under normal operating conditions, and is of high operating efficiency.

A still further object is the provision in a coupling of this character of means for insuring continuance of the drive from one shaft to the other in case of accidental shearing of the spherical elements and for relieving them from excessive shearing stress.

Other objects, advantages and novel features of design, construction and arrangement comprehended by the invention are hereinafter more particularly pointed out or will be readily understood by those familiar with the art from the following description of a coupling constructed in accordance therewith and illustrated in the accompanying drawing, in which Fig. 1 is an end view of the coupling with one of the shafts to which it is attached shown in section;

Fig. 2 is a fragmentary section through the coupling and shafts substantially on the line 2—2 in Fig. 1;

Fig. 3 is an enlarged perspective view of one of the retainer blocks;

Fig. 4 is a fragmentary somewhat diagrammatic radial section of a portion of the coupling showing the relative positions of certain of its parts when the shafts are out of axial alignment; and Fig. 5 is a generally similar view designed to assist in explanation of the operation of the coupling under such circumstances.

Throughout the drawing like characters of reference are used in the several figures to designate the same parts.

As shown, the coupling comprises a male member 1, a female member 2 and balls 3 interposed between them. The male member includes a hub 4 centrally bored for the reception of one of the shafts S, S' between which the coupling is interposed and to which it is keyed or otherwise suitably secured, the hub having a peripheral flange 5 proximate its inner end. Abutting and overlying this flange is a retainer ring 6 detachably secured to it by axially extending bolts 7 and nuts 8, the flange being offset sufficiently from the inner face of the hub to provide a channel for the reception of the bolt heads so they will lie flush with or below the inner face of the member, and in the outer face of the retainer ring is a series of equidistantly spaced substantially semi-spherical sockets 9 for the reception of those portions of balls 3 lying nearest the center of the coupling; as shown, the ring is provided with eight of these sockets but a greater or less number may be utilized if preferred.

The female member 2 also includes a centrally bored hub 10 adapted for suitable securement to the end of the other shaft S' and carrying an outwardly directed web 11 proximate its inner end and an overhanging flange 12, these several parts being preferably integral and the length of the flange measured axially of the coupling being sufficient to substantially overlie the male member when the coupling is assembled on the shafts. Extending inwardly from the free end of the flange are slots 13 symmetrically spaced about the flange and corresponding in number to sockets 9. These slots terminate at or adjacent web 11, are preferably but not necessarily rectangular in cross section and each is adapted to receive a retainer block 15, one of which is best shown in Fig. 3, the block forming a snug but sliding fit in the slot.

That face of each block which is directed toward the center of the coupling is provided with a central groove 16 to receive that portion of the adjacent ball remote from said center, the bottom of the groove lying in a radial plane containing the axis of the coupling and conforming to an arc struck on a radius R from the point at which it is intersected by a plane containing the centers of the balls, the depth of the groove as determined by the length of radius R being such that when the coupling is assembled the balls will bottom in the grooves in the adjacent blocks and also in sockets 9 in the retaining ring. In addition, the diameter of the latter with respect to the inner diameter of flange 12 is such that a material clearance 17 is afforded between them while when the members are properly assembled on the shafts a generally similar clearance 18 is provided in an axial direction.

It will thus be apparent that the retainer blocks can slide longitudinally of the coupling in their respective slots but are held against outward radial movement by the flange in which they are seated and from inward radial movement by balls 3 in cooperation with the retaining ring.

The balls 3 may be of any material suitable for the performance of their intended function although those made of a resilient one such as rubber or, preferably, "neoprene," will usually be preferred to those made of a non-resilient one such as steel or bronze since they tend to cushion the shock when the power is applied to the driving shaft and afford a yielding and cushioned drive thereafter; moreover, they are noiseless in operation and of course require no lubrication.

When the coupling is in operation the drive from one of the shafts, for example S, is normally communicated through balls 3 to member 2 and thence to shaft S' or vice versa, but conditions sometimes arise, as when an excessive overload is suddenly thrown on the coupling, which result in the balls being sheared, thus severing the driving connection between one member and the other. In such case if the power is not instantly shut off the machinery connected with the driving shaft may be seriously damaged, so in couplings intended for use where such conditions may occur I preferably provide means for insuring a positive continuance of the drive even though the balls be accidentally sheared. To this end, therefore, I may dispose in flange 12 two or more pairs of diametrically opposed keys 20 which are welded or otherwise permanently fixed in suitable slots in its inner face so that each projects into a slot 21 in the periphery of retaining ring 6, the slots being considerably larger than the keys so they normally clear the latter on all sides. The keys thus have no contact with the ring under ordinary conditions of operation but should the balls give way for any reason one side or the other of each of slots 21, depending on the direction of rotation of the driving shaft, is brought into engagement with the adjacent key and the drive from one member of the coupling to the other thus positively continued until the power can be shut off and repairs made. Moreover if the normal clearance between the sides of slots 21 and keys 20 be made slightly less than the amount the members of the coupling can be relatively rotated without compressing the balls beyond their elastic limit, the keys will engage the male member before that limit is reached, thus establishing a positive drive between the members and preventng shearing of the balls. It will be appreciated, however, that the provision of the safety means just described is but a precautionary measure and therefore may be omitted if desired.

Mention has been made of the fact that the coupling is capable of effecting an equal distribution of the load on all the balls even though shafts S, S' are slightly out of axial alignment, a condition which often arises either because the shafts are initially incorrectly positioned or because of subsequent slight shifting of the parts to which they are connected. In Fig. 4 I have indicated the approximate relative positions of the members of the coupling when such axial disalignment is present and it will be apparent from an inspection of this figure that even under such circumstances the balls continue to bottom in the retainer blocks as a result of the arcuate form of the grooves therein to which reference has been made, whereby each ball carries its proper proportion of the load in exactly the same way as when there is no axial disalignment of the shafts and the parts consequently in the position of Fig. 2. Such, however, would not be the case if the walls of the grooves in the retainer blocks are made parallel to the axis of the coupling for then, as demonstrated by Fig. 5, upon disalignment of the shafts certain of the balls in the series at any given instant during rotation of the coupling no longer bottom in the grooves in the retainer blocks and so transmit no power from the driving to the driven member with resultant imposition on other balls in the series of a disproportionate part of the entire load. Thus in a coupling constructed as shown in Fig. 5 or in any equivalent way, at some point during each revolution when the shafts are out of line each ball is subjected to a very heavy overload in consequence of which the balls as a whole wear out very rapidly while the efficiency of the coupling as a power transmitting element is materially reduced. On the other hand the ability of the coupling of my invention to maintain an even distribution of load on the balls irrespective of whether or not the shafts are in alignment not only prolongs the life of the balls but also enhances operating efficiency.

In assembling the coupling on the shafts, the retaining ring is first slid over the end of shaft S and the hub portion of the male member, with bolts 7 seated in flange 5, and the corresponding portion of the female member then secured in place upon the shafts and the latter lined up and preferably so adjusted longitudinally as to afford a slight clearance between their ends as shown in Fig. 2. The retainer blocks, balls and retaining ring are then slipped into place and the ring secured in position by nuts 8. Thereafter at all times the condition of the balls can be observed through the grooves in the blocks and should any further longitudinal adjustment of the shafts be required the blocks can slide in the female member in correspondence thereto while by merely removing nuts 8 and sliding back the retainer ring and blocks until the latter clear slots 13, the balls can be readily renewed whenever required without disturbing the adjusted position of the female member and the hub portion of the male member upon their respective shafts.

Extended tests have demonstrated these couplings exhibit high operating efficiency and in use are extremely easy on the machinery connected with the shafts, their flexibility and resilience materially reducing stripping of gears and breakage of other parts included therein, while their convenience of installation, inspection and repair and ability to operate satisfactorily with the shafts in slight axial disalignment are of great advantage from a maintenance and operating standpoint.

While I have herein described one form of coupling constructed in accordance with the invention which has given extremely good results in practice, I do not thereby desire or intend to limit or restrict myself specifically thereto as the various instrumentalities comprised therein are capable of numerous changes and modifications in design, construction, arrangement and method of assembly without departing from the spirit and scope of the invention as defined in the appended claims.

Having thus described my invention, I claim and desire to protect by Letters Patent of the United States:

1. A coupling of the class described comprising male and female members, the male member including a hub portion adapted for securement to one of the shafts to be coupled and a retainer ring detachably secured thereto having a series of substantially semi-spherical sockets in its periphery, said female member including a hub portion adapted for securement to the other of said shafts and a flange adapted to overhang said ring when the members are operatively assembled, the ring being of less diameter than the flange to afford a clearance therebetween, ball receiving means associated with the flange, a series of balls interposed between the members and respectively extending into said means and said sockets to form the normal driving connection between the members, and means carried by one member and extending across said clearance and loosely into an opening in the other member and adapted to engage the latter upon predetermined relative rotation of the members to thereby form a positive supplemental driving connection therebetween.

2. A coupling of the class described comprising male and female members, the male member including a hub portion adapted for securement to one of the shafts to be coupled and a retainer ring detachably secured thereto having a series of substantially semi-spherical sockets in its periphery, said female member including a hub portion adapted for securement to the other of said shafts and a flange adapted to overhang said ring when the members are operatively assembled, the ring being of less diameter than the flange to afford a clearance therebetween, ball receiving means associated with the flange, a series of balls interposed between the members and respectively extending into said means and said sockets to form the normal driving connection between the members, diametrically opposed keys carried by one member each projecting across said clearance into but normally out of contact with the sides of an opening in the other member and adapted to engage one of said sides after predetermined relative rotation of the members to thereby form a positive supplemental driving connection therebetween.

3. A coupling of the class described comprising male and female members respectively adapted for securement to the shafts to be coupled, the male member including a peripheral surface having a series of substantially semi-spherical sockets, said female member including a flange adapted to overhang the male member when the members are operatively assembled, the male member being of less diameter than the female member to afford a clearance therebetween, ball receiving means associated with the flange, a series of balls interposed between the members and respectively extending into said means and said sockets to form the normal driving connection between the members, one of said members having diametrically opposed slots and the other member diametrically opposed keys of less width than the slots projecting across the clearance between the members and into the slots whereby said keys are normally out of contact with their walls but adapted on predetermined relative rotation of the members to engage one of said walls and thereby form a positive supplemental driving connection between them.

4. A coupling of the class described comprising male and female members respectively adapted for securement in axially spaced relation to the shafts to be coupled, a male member including a hub portion and a retainer ring detachably connected thereto having a series of substantially semi-spherical sockets in its periphery, the female member including a hub portion and a flange adapted to overhang and clear said ring when the members are in operative position and including a series of substantially rectangular slots extending axially of the coupling, substantially rectangular grooved retainer blocks slidably seated in said slots, and a series of balls interposed between said members and respectively engaging in said sockets and in the grooves in the blocks, the bottoms of said grooves conforming from end to end to arcs struck from the axis of the coupling.

5. A coupling of the class described comprising male and female members respectively adapted for securement in longitudinally spaced relation to the shafts to be coupled, the male member including a hub portion and a retainer ring detachably connected thereto having a series of substantially semi-spherical sockets in its periphery, the female member including a hub portion and a flange adapted to overhang and clear said ring when the members are in operative position and having a plurality of substantially rectangular radially inwardly directed slots extending parallel to the flange axis, grooved ball receiving means seated in the slots and longitudinally slidable therein with respect to the flange, the bottoms of the grooves in said means being symmetrically curved with respect to the axis of the coupling, and a series of balls interposed between said members and engaging in said grooves and sockets to form a driving connection between the members.

6. A coupling of the class described comprising male and female members respectively adapted for securement in axially spaced relation to the shafts to be coupled, the male member including a hub portion having an outwardly directed flange adjacent its inner end, a retainer ring proximate said flange having a series of substantially semi-spherical sockets in its periphery and means detachably securing the ring to the flange, said female member including a hub portion, an outwardly directed web and a flange projecting therefrom adapted to overhang and clear said ring when the members are in operative position, the inner face of the flange having a series of longitudinally extending substantially rectangular slots, substantially rectangular retainer blocks slidably seated in said slots, and a series of balls respectively interposed between the blocks and the ring and extending into said grooves and sockets to form a driving connection between the members, the grooves in the blocks conforming to the balls transversely of the blocks and from end to end to arcs struck from the axis of the coupling.

GEORGE E. PULLIAM.

(References on following page)

REFERENCES CITED

The following references are of record in the file of this patent:

UNITED STATES PATENTS

| Number | Name | Date |
|---|---|---|
| 1,440,847 | Sundh | Jan. 2, 1923 |
| 1,590,055 | Porter | June 22, 1926 |
| 1,650,202 | Evans et al. | Nov. 22, 1927 |
| 1,915,654 | Edmunds | June 27, 1933 |
| 2,033,583 | McCarrell | Mar. 10, 1936 |

FOREIGN PATENTS

| Number | Country | Date |
|---|---|---|
| 3,521 | Great Britain | 1907 |
| 28,057 | Great Britain | 1912 |
| 149,504 | Great Britain | 1920 |
| 278,163 | Germany | 1912 |